United States Patent

Meier et al.

[11] Patent Number: 5,902,835
[45] Date of Patent: May 11, 1999

[54] GROUP IVB METAL BLOWING CATALYST COMPOSITIONS FOR THE PRODUCTION OF POLYURETHANE FOAMS

[75] Inventors: Ingrid Kristine Meier, Asbury, N.J.; Mark Leo Listemann; Michael John Kimock, both of Kutztown, Pa.

[73] Assignee: Air Products and Chemicals, Inc., Allentown, Pa.

[21] Appl. No.: 09/085,915

[22] Filed: May 28, 1998

[51] Int. Cl.[6] .................................................. C08G 18/22
[52] U.S. Cl. .......................... 521/125; 521/172; 521/174
[58] Field of Search ............................................. 521/125

[56] References Cited

U.S. PATENT DOCUMENTS

| | | | |
|---|---|---|---|
| 3,073,788 | 1/1963 | Hostettler et al. | 260/2.5 |
| 3,201,358 | 8/1965 | Hostettler et al. | 260/2.5 |
| 3,222,305 | 12/1965 | Lanham | 260/2.5 |
| 3,450,648 | 6/1969 | Windemuth et al. | 260/2.5 |
| 3,673,159 | 6/1972 | Dijkhuizen et al. | 260/77.5 |
| 4,263,411 | 4/1981 | Bak | 521/125 |
| 4,264,486 | 4/1981 | McLaughlin | 260/33.6 |
| 4,271,273 | 6/1981 | Biranowski et al. | 521/125 |
| 4,374,968 | 2/1983 | McLaughlin | 528/54 |
| 4,642,319 | 2/1987 | McDaniel | 521/125 |
| 4,644,019 | 2/1987 | McDaniel | 521/125 |
| 5,733,945 | 3/1998 | Simpson | 521/125 |

Primary Examiner—Morton Foelak
Attorney, Agent, or Firm—Mary E. Bongiorno

[57] ABSTRACT

An improved method of preparing polyurethane foam by reacting an organic polyisocyanate with a polyol in the presence of water and a combination of a gelling catalyst and a blowing catalyst, in which the blowing catalyst is a compound represented by the following formulae:

$[M(L^1)(L^2)(L^3)(L^4)]_n$ $[M(L^1)(L^2)(L^3)]_n$ $[M(L^1)(L^2)]_n$ $[M(L^1)]_n$ wherein M is titanium, zirconium, or hafnium; n ranges from 1 to 20; and each of $L^1$, $L^2$, $L^3$, and $L^4$ is the same or different ligand selected from the following groups: (1) oxygen, sulfur and nitrogen; (2) an alcoholate, phenolate, glycolate, thiolate, carboxylate, dithiocarbamate, aminate, aminoalcoholate, phosphate, phosphonate, pyrophosphate, sulfonate, or silylamide any of which contains from 1 to 20 carbon atoms and, optionally, contains one or more functional groups, or oxygen, sulfur, nitrogen, or phosphorus-containing; (3) a chelating ligand, such as, various non-fluorine containing and non-sterically hindered β-diketones, triethanolamine, salicylaldehyde, and salicylamide.

13 Claims, No Drawings

GROUP IVB METAL BLOWING CATALYST COMPOSITIONS FOR THE PRODUCTION OF POLYURETHANE FOAMS

BACKGROUND OF THE INVENTION

Polyurethane foams are widely used in automotive, housing and other industries. The foams are produced through the reaction of a polyisocyanate with a polyol in the presence of various additives. One class of additives which is particularly effective as blowing agents is the chlorofluorocarbons (CFCs). CFCs vaporize as a result of the reaction exotherm during polymerization and cause the polymerizing mass to form a foam. However, the discovery that CFCs deplete ozone in the stratosphere has resulted in mandates for restricting CFC use. Therefore, more efforts have gone into the development of alternatives to CFCs for forming urethane foams and water blowing has emerged as an important alternative. In this method, blowing occurs from carbon dioxide generated by the reaction of water with the polyisocyanate. Foams can be formed by a one-shot method or by formation of a prepolymer and subsequent reaction of the prepolymer with water in the presence of a catalyst to form the foam. Regardless of the method, a balance is needed between reaction of the isocyanate and the polyol (gelling) and the reaction of the isocyanate with water (blowing) in order to produce a polyurethane foam in which the cells are relatively uniform and the foam has specific properties depending on the anticipated application; for example, rigid foams, semi-rigid foams, and flexible foams.

The ability of the catalyst to selectively promote either blowing or gelling is an important consideration in selecting a catalyst for the production of a polyurethane foam with specific properties. If a catalyst promotes the blowing reaction to too high a degree, carbon dioxide will be evolved before sufficient reaction of isocyanate with polyol has occurred. The carbon dioxide will bubble out of the formulation, resulting in collapse of the foam and production of a poor quality foam. At the opposite extreme, if a catalyst promotes the gelling reaction too strongly, a substantial portion of the carbon dioxide will be evolved after a significant degree of polymerization has occurred. Again, a poor quality foam is produced; characterized by high density, broken or poorly defined cells, or other undesirable features. Frequently, a gelling catalyst and a blowing catalyst are used together to achieve the desired balance of gelling and blowing in the foam.

Tertiary amine catalysts have been used to accelerate both blowing (reaction of water with isocyanate to generate carbon dioxide) and gelling (reaction of polyol with isocyanate) and have been shown to be effective in balancing the blowing and gelling reactions to produce a desirable product. However, tertiary amines generally have offensive odors and many are highly volatile due to low molecular weight. Release of tertiary amines during foam processing may present significant safety and toxicity problems, and release of residual amines from consumer products is generally undesirable. Reduction in the amount of tertiary amine catalysts used in the production of polyurethane foams is therefore desirable.

The following references disclose a variety of compounds which can be used alone or in combination with tertiary amines to accelerate curing of polyurethane foams and/or produce polyurethane foams with enhanced properties.

U.S. Pat. No. 3,073,788 (Hostettler et al., 1963) discloses the production of foamed polymers from isocyanate-modified alkylene oxide addition products of glycosides in which a variety of compounds are used to catalyze the foaming and crosslinking reaction; for example inorganic and organic bases such as sodium hydroxide, tertiary amines and phosphines, various metal compounds, such as titanium tetrachloride, bis(cyclopentadienyl) titanium difluoride, and a wide variety of organic tin compounds.

U.S. Pat. No. 3,201,358 (Hostettler et al., 1965) discloses a method of preparing polyurethane foams using a catalyst of antimony trichloride, titanium tetrachloride, or dioctyl lead dichloride in combination with a tertiary amine in which the nitrogen is bonded to three aliphatic and cycloaliphatic carbon atoms.

U.S. Pat. No. 3,222,305 (Lanham, 1965) discloses a wide variety of catalysts for accelerating the reactive hydrogen/isocyanate reaction in producing flame-resistant urethane foams. Examples of disclosed catalysts are tertiary amines; tertiary phosphines; strong bases; acidic metal salts; chelates of various metals, such as magnesium, bismuth, and titanium; alcoholates and phenolates of various metals; and organometallic compounds. Dibutyltin dilaurate alone or together with N,N,N',N'-tetramethyl-1,3-butanediamine was used in the examples.

U.S. Pat. No. 3,450,648 (Windemuth et al, 1969) discloses a process for making cellular polyurethane plastics in the presence of a catalyst which is a mixture of a tertiary amine and one of eleven specific non-basic metal compounds; for example, $TiCl_2(C_5H_7O_2)_2$, titanium tetrabutylate, and titanium dichloride diethyl. At levels of about 0.00001 to 0.1% weight of metal based on the total weight of the reactants, the non-basic metal compounds were reported to be useful in producing foamed plastics with improved tensile strength and no cracking.

Following are references which describe the use of Group 3 and 4 metal compounds for the preparation of polyurethanes, without the formation of bubbles or excess foam, even in the presence of water.

U.S. Pat. No. 3,673,159 (Dijkhuizen et al., 1972) discloses the use of organic zirconium compounds, specifically zirconium alcoholates, as catalysts for the preparation of unfoamed polyurethane from the reaction of isocyanates with polyols. If the polyol component contains trace water, the catalyst is added prior to the isocyanate to remove the water.

U.S. Pat. No. 4,264,486 (McLaughlin, 1981) and U.S. Pat. No. 4,374,968 (McLaughlin, 1983) disclose a method of forming an isocyanate polymer with little foam, in the presence of water, by using a catalytic mixture containing a Group 3 or 4 metal compound, such as dibutyl tin diacetate and tributyl titanate. Since these catalysts do not catalyze the reaction between the isocyanate and water, the gelation times are extended and little foam is produced.

BRIEF SUMMARY OF THE INVENTION

This invention is directed to an improved method of preparing polyurethane foam by reacting an organic polyisocyanate with a polyol in the presence of water using a catalyst system containing a gelling catalyst and a blowing catalyst. The improvement is achieved by using a catalytically effective amount of a Group IVB metal blowing catalyst represented by one or more of the following formulas:

$$[M(L^1)(L^2)(L^3)(L^4)]_n$$

$$[M(L^1)(L^2)(L^3)]_n$$

$$[M(L^1)(L^2)]_n$$

$$[M(L^1)]_n$$

wherein M is titanium, zirconium, or hafnium; each of $L^1$, $L^2$, $L^3$, and $L^4$ can be the same or different ligands selected from the following groups: (1) oxygen, sulfur and nitrogen; (2) an alcoholate, phenolate, glycolate, thiolate, carboxylate, dithiocarbamate, aminoalcoholate, phosphonate, pyrophosphate, sulfonate, or silylamide any of which contains from 1 to 20 carbon atoms and, optionally, contains one or more functional groups (e.g., hydroxy, amino, thiolato, carboxylato, phosphato, pyrophosphato, phosphino, and sulfonato), or oxygen, sulfur, nitrogen, or phosphorus-containing linkages (e.g., ether, thioether, amine, imine, carbonyl, or phosphine); (3) a chelate such as can be obtained from various non-fluorine containing, non-sterically hindered β-diketones such as acetylacetone, benzoylacetone, dibenzoylmethane, ethyl benzoylacetate, methyl acetoacetate, ethyl acetoacetate, and 2,4-pentanedione, and other chelating ligands such as N,N-dimethylethanolamine, triethanolamine, salicylamide, salicylaldehyde, phenylsalicylate, cyclopentanone-2-carboxylate, acetalacetoneimine, bis-acetylacetylacetone, thioacetylacetone, N,N'-bis(salicylidene)ethylenediamine, etc., and n can range from 1 to 20.

It was found that, by using the above blowing catalyst composition in combination with a gelling catalyst, an excellent balance of gelling and blowing was achieved while maintaining a good conversion rate to polyurethane foam.

BRIEF DESCRIPTION OF SEVERAL VIEWS OF THE DRAWINGS

Not applicable.

DETAILED DESCRIPTION OF THE INVENTION

The catalyst compositions according to the invention catalyze the reaction between an isocyanate functionality and an active hydrogen-containing compound, i.e. an alcohol, a polyol, an amine or water, especially the urethane (gelling) reaction of polyol hydroxyls with isocyanate to make polyurethanes and the blowing reaction of water with isocyanate to release carbon dioxide in order to produce foamed polyurethanes.

Blowing catalyst, as used herein, refers to a catalyst which displays a blow-to-gel selectivity of at least about 1 during the first 2.5 minutes of a model reaction containing monofunctional reactants similar to reactants used in the production of polyurethane foam. Blow-to-gel selectivity is defined as the ratio of the normalized amount of blowing (urea formation) to the normalized amount of gelling (urethane formation.) A selectivity of 1 indicates that the amount of blowing and gelling is equal. A selectivity greater than 1 is indicative of a blowing catalyst and a selectivity below about 0.5 is indicative of a gelling catalyst. The blowing catalyst must also show an isocyanate conversion rate which is notably higher than conversion achieved in the absence of a catalyst.

An example of a model reaction to determine blow-to-gel selectivity and catalyst activity (i.e., isocyanate conversion) is described in Example 5. To test the blow-to-gel selectivity and the activity of a compound, comparison is made to a thermal background reaction, i.e., the reaction in which reactants and conditions are the same but no catalyst is present.

The blowing catalyst composition is a Group IVB compound represented by one or more of the following formulae:

$[M(L^1)(L^2)(L^3)(L^4)]_n$ $[M(L^1)(L^2)(L^3)]_n$ $[M(L^1)(L^2)]_n$ $[M(L^1)]_n$ wherein M is titanium, zirconium, or hafnium; $L^1$, $L^2$, $L^3$, and $L^4$ are the same or different ligands selected from the following groups: (1) O, S, or N; (2) an alcoholate, phenolate, glycolate, thiolate, carboxylate, dithiocarbamate, aminoalcoholate, phosphonate, pyrophosphate, sulfonate, or silylamide any of which contains from 1 to 20 carbon atoms and, optionally, contains one or more functional groups (i.e., hydroxy, amino, thiolato, carboxylato, phosphato, pyrophosphato, phosphino, sulfonato, etc.), or oxygen, sulfur, nitrogen, or phosphorus-containing linkages (for example, ether, thioether, amine, imine, carbonyl, or phosphine linkages); (3) a chelating ligand; for example, various non-fluorine containing, non-sterically hindered 1-diketones such as acetylacetone, benzoylacetone, dibenzoylmethane, ethyl benzoylacetate, methyl acetoacetate, ethyl acetoacetate, and 2,4-pentanedione (also know as acetyl acetone), and other chelating ligands such as N,N-dimethylethanolamine, triethanolamine, salicylaldehyde, salicylamide, phenylsalicylate, cyclopentanone-2-carboxylic acid, acetalacetoneimine, bis-acetylacetylacetone, thioacetylacetone, N,N'-bis (salicylidene)ethylenediamine, etc., and n ranges from 1 to 20. The preferred blowing catalyst composition contains one or more chelating ligands of group (3).

Preferred blowing catalysts of this invention include titanium(IV) isopropoxide, titanium(IV) n-butoxide, titanium (IV) 2-ethylhexoxide, zirconium (IV) n-butoxide, zirconium(IV) n-pentoxide, titanium(IV) bis(ethyl acetoacetato)diisopropoxide, titanium(IV) diisopropoxide bis(2,4-pentanedionate), titanium(IV) tris isopropoxide (2,4-pentanedionate), titanium(IV) (triethanolaminato) isopropoxide, titanium(IV) (triethanolaminato)n-butoxide, titanium(IV) (N,N'-bis(salicylidene)ethylenediimino) diisopropoxide, titanium(IV) oxide acetylacetonate, isopropyl triisostearoyl titanate, zirconium(IV) tris isopropoxide (2,4-pentanedionate), zirconium(IV) tris-n-propoxide (2,4-pentanedionate), zirconium(IV) di-n-butoxide bis(2,4-pentanedionate), zirconium(IV) tris-n-pentoxide (2,4-pentanedionate), zirconium(IV) tris-t-butoxide (2,4-pentanedionate), zirconium(IV) (triethanolaminato) isopropoxide, zirconium(IV) acetylacetonate, zirconium (IV) acetylacetonate hydrate, neopentyl(diallyl)oxy trineodecanoyl zirconate, and neopentyl(diallyl)oxy trimethacryl zirconate.

Of the above titanium(IV) and zirconium(IV) blowing catalysts, the most preferred are titanium(IV) isopropoxide, titanium(IV) diisopropoxide bis(2,4-pentanedionate), titanium(IV) tris isopropoxide (2,4-pentanedionate), titanium(IV) (triethanolaminato)n-butoxide, titanium(IV) (N,N'-bis(salicylidene)ethylenediimino) diisopropoxide, zirconium(IV) n-pentoxide, zirconium(IV) tris isopropoxide (2,4-pentanedionate), zirconium(IV) tris-n-propoxide (2,4-pentanedionate), zirconium(IV) di-n-butoxide bis(2,4-pentanedionate), zirconium(IV) tris-n-pentoxide (2,4-pentanedionate), zirconium(IV) tris-t-butoxide (2,4-pentanedionate), zirconium(IV) (triethanolaminato) isopropoxide, zirconium (IV) acetylacetonate, zirconium (IV) acetylacetonate hydrate, and neopentyl(diallyl)oxy trineodecanoyl zirconate.

Many of the above types of catalysts can form agglomerates and/or higher molecular weight condensation products in which two or more metal centers are bridged by one or more ligands; therefore, n can range from 1 to approximately 20; 1 to 10 is preferred.

The gelling catalyst can be any of the well known gelling catalysts for polyurethane foams such as a tertiary amine. Suitable gelling catalysts include but are not limited to trimethylamine, triethylamine, tributylamine, trioctylamine, diethyl cyclohexylamine, N-methylmorpholine, N-ethylmorpholine, N-octadecylmorpholine (N-cocomorpholine), N-methyldiethanolamine, N,N-dimethylethanolamine, N,N'-bis(2-hydroxypropyl) piperazine, N,N,N',N'-tetramethylethylenediamine, N,N,N', N'-tetramethyl-1,3-propanediamine, triethylenediamine (1,4-diazabicyclo[2.2.2]octane), 1,8-diazabicyclo(5.4.0) undecene-7, 1,4-bis(2-hydroxypropyl)-2-methylpiperazine, N,N'-dimethylbenzylamine, N,N-dimethylcyclohexylamine, benzyltriethylammonium bromide, bis(N,N-diethylaminoethyl)adipate, N,N-diethylbenzylamine, N-ethylhexamethyleneamine, N-ethylpiperidine, alpha-methylbenzyldimethylamine, dimethylhexadecylamine, dimethylcetylamine, and the like. The gelling and blowing catalyst composition may be used in combination with other carboxylate and metal urethane catalysts such as bismuth, zinc, cobalt, etc., that are well known in the urethane art. The blowing catalyst of this invention can be used as the sole blowing catalyst or in combination with other blowing catalysts. Suitable blowing catalysts include but are not limited to bis(dimethylaminoethyl)ether, pentamethyidiethylenetriamine, 2-[N-(dimethylaminoethoxyethyl)-N-methylamino]ethanol, and the like. Balanced gelation and blowing catalysts, as well as delayed-action catalysts, can also be combined with the blowing catalyst of this invention.

A catalytically effective amount of the catalyst composition (i.e., gelling and blowing catalysts) is used in the polyurethane formulation. Suitable amounts of the catalyst composition may range from 0.015 to 10 parts per 100 parts polyol (pphp) in the polyurethane formulation. Suitable amounts of the blowing catalyst may range from about 0.01 to 10 parts per 100 parts polyol (pphp) in the polyurethane formulation, with the preferred range from 0.05 to 2 parts per 100 parts polyol (pphp).

An effective amount of blowing catalyst can be determined by measuring both catalyst activity (% conversion of isocyanate) and the blow-to-gel selectivity of the catalyst during the first 2.5 minutes of reaction. The blowing catalysts of the invention are characterized by a blow-to-gel selectivity of at least about 1 within the first 2.5 minutes of reaction, as determined by a model reaction such as that described in Example 5. In the model reaction, conversion rates and selectivity are typically measured at ½-minute intervals.

The Group IVB metal compounds must be added to the formulation at the appropriate time in order to prevent deactivation. For example, the most unstable compounds should be added via a separate stream immediately before isocyanate addition. The more stable compounds can be added to the premix.

The polyurethane products are prepared using any suitable organic polyisocyanates well known in the art including, for example, hexamethylene diisocyanate, phenylene diisocyanate, toluene diisocyanate (TDI) and 4,4'-diphenylmethane diisocyanate (MDI). Especially suitable are the 2,4- and 2,6-TDI's individually or together as their commercially available mixtures. Other suitable isocyanates are mixtures of diisocyanates known commercially as "crude MDI", also known as PAPI, which contain about 60% of 4,4'-diphenylmethane diisocyanate along with other isomeric and analogous higher polyisocyanates. Also suitable are "prepolymers" of these polyisocyanates comprising a partially prereacted mixture of a polyisocyanate and a polyether or polyester polyol.

Illustrative of suitable polyols as a component of the polyurethane composition are the polyalkylene ether and polyester polyols. The polyalkylene ether polyols include the poly(alkylene oxide) polymers such as poly(ethylene oxide) and poly(propylene oxide) polymers and copolymers with terminal hydroxyl groups derived from polyhydric compounds, including diols and triols; for example, among others, ethylene glycol, propylene glycol, 1,3-butanediol, 1,4-butanediol, 1,6-hexanediol, neopentyl glycol, diethylene glycol, dipropylene glycol, pentaerythritol, glycerol, diglycerol, trimethylol propane and like low molecular weight polyols.

In the practice of this invention, a single high molecular weight polyether polyol may be used. Also, mixtures of high molecular weight polyether polyols such as mixtures of di- and trifunctional materials and/or different molecular weight or different chemical composition materials may be used.

Useful polyester polyols include those produced by reacting a dicarboxylic acid with an excess of a diol, for example, adipic acid with ethylene glycol or butanediol, or reacting a lactone with an excess of a diol such as caprolactone with propylene glycol.

In addition to the polyether and polyester polyols, the masterbatches, or premix compositions, frequently contain a polymer polyol. Polymer polyols are used in polyurethane foam to increase the foam's resistance to deformation, i.e. to increase the load-bearing properties of the foam. Currently, two different types of polymer polyols are used to achieve load-bearing improvement. The first type, described as a graft polyol, consists of a triol in which vinyl monomers are graft copolymerized. Styrene and acrylonitrile are the vinyl monomers of choice. The second type, a polyurea modified polyol, is a polyol containing a polyurea dispersion formed by the reaction of a diamine and TDI. Since TDI is used in excess, some of the TDI may react with both the polyol and polyurea. This second type of polymer polyol has a variant called PIPA polyol which is formed by the in-situ polymerization of TDI and alkanolamine in the polyol. Depending on the load-bearing requirements, polymer polyols may comprise 20–80% of the polyol portion of the masterbatch.

Other agents typically found in the polyurethane foam formulations include chain extenders such as ethylene glycol and butanediol; crosslinkers such as diethanolamine, diisopropanolamine, triethanolamine and tripropanolamine; blowing agents such as water, methylene chloride, trichlorofluoromethane, and the like; and cell stabilizers such as silicones.

The following formulation is a general polyurethane flexible foam formulation having a 1–3 lb/ft$^3$ (16–48 kg/m$^3$) density (e.g., automotive seating) containing a gelling catalyst, such as triethylenediamine (TEDA), and a blowing catalyst according to this invention:

| Flexible Foam Formulation | Parts by Weight |
| --- | --- |
| Polyol | 20–100 |
| Polymer Polyol | 0–80 |
| Silicone Surfactant | 0.2–2.5 |
| Blowing Agent (e.g., water) | 2–4.5 |
| Crosslinker | 0.5–2 |
| Catalyst (Gelling and Blowing) | 0.2–2 |
| Isocyanate Index | 70–115* |

*Isocyanate Index = (mole isocyanate/mole active hydrogen) × 100

EXAMPLE 1

Preparation of Group IVB Metal Alkoxide Compounds

A general procedure for preparing titanium and zirconium alkoxides, glycoxides, and triethanolamine complexes is given in this example. This procedure is a modification of the preparations of titanium and zirconium alkoxides via alcoholysis of the corresponding metal isopropoxide compounds that are described in the literature (D. C. Bradley, R. C. Mehrotra, and W. Wardlaw, *J. Chem. Soc.,* 1952, pages 2027–2031). The preparation of Group IVB metal alkoxide complexes via alternative routes is also described in the literature (D. C. Bradley, R. C. Mehrotra, and D. P. Gaur, Metal Alkoxides, Academic Press, 1978).

Zirconium(IV) (triethanolaminato)isopropoxide (Zr(OiPr)(TEA))

The procedure was performed in an inert atmosphere glove box. Zirconium(IV) isopropoxide isopropanol complex (11.463 g, 29.57 mmol) was dissolved in anhydrous hexane (125 ml). To this slightly cloudy mixture was added dry triethanolamine (4.422 g, 29.64 mmol), and the reaction mixture was stirred at room temperature for approximately 16 hours. After this time, the mixture was filtered and the filtrate was taken to dryness under vacuum. The white solid was re-dissolved in anhydrous hexane (50 ml), and the solvent was again removed under vacuum. The product was obtained as a white solid in 81% yield.

Additional titanium and zirconium complexes can be obtained by using a similar procedure. The titanium(IV) isopropoxide or zirconium(IV) isopropoxide isopropanol complex is dissolved in hexane, and the hydroxy-functionalized ligand is added to the isopropoxide complex either as a neat liquid or as a solution in hexane or dichloromethane. The reaction mixture is stirred overnight at room temperature. If the product precipitates from the reaction mixture, it is filtered and washed with hexane before it is dried under vacuum. If the product remains in solution after 16 hours, the mixture is filtered, and the filtrate is taken to dryness under vacuum. If the product is not a powder or crystalline solid, it is re-dissolved in hexane and the solvent is removed under vacuum. The latter procedure has the effect of removing any excess isopropyl alcohol as a hexane/isopropyl alcohol azeotrope.

EXAMPLE 2

Preparation of Group IVB Metal Chelate Compounds

This procedure is a modification of the preparations of titanium and zirconium chelate compounds that are described in the literature (U. B. Saxena, A. K. Rai, V. K. Mathur, R. C. Mehrotra, and D. Radford, *J. Chem. Soc.* (A), 1970, pages 904–907). The preparation of Group IVB metal chelate complexes via alternative routes is also described in the literature (R. C. Mehrotra, R. Bohra, and D. P. Gaur, *Metal β-Diketonates and Allied Derivatives,* Academic Press, 1978; and R. C. Mehrotra and R. Bohra, *Metal Carboxylates,* Academic Press, 1983).

Zirconium(IV) (tris-isopropoxide)(acetvlacetonate) (Zr(OiPr)$_3$(acac))

The procedure was performed in an inert atmosphere glove box. Zirconium(IV) isopropoxide isopropanol complex (33.946 g, 87.564 mmol) was dissolved in anhydrous dichloromethane (400 ml). To this solution was added dry 2,4-pentanedione (8.768 g, 87.57 mmol). Additional dichloromethane (10 ml) was used to ensure complete transfer, and the reaction mixture was stirred at room temperature for approximately 20 hours. After this time, the mixture was filtered and the filtrate was taken to dryness under vacuum. The white solid was re-dissolved in anhydrous hexane (200 ml), and the solvent was again removed under vacuum. The product was obtained as a white solid in 92% yield.

Additional titanium and zirconium chelate complexes can be obtained by using a similar procedure. The titanium(IV) isopropoxide or zirconium(IV) isopropoxide isopropanol complex is dissolved in dichloromethane or hexane, and the chelating ligand (in the desired ratio) is added to the isopropoxide complex either as a neat liquid or as a solution in hexane or dichloromethane. The reaction mixture is stirred overnight at room temperature. If the product precipitates from the reaction mixture, it is filtered and washed with hexane before it is dried under vacuum. If the product remains in solution after 16–20 hours, the mixture is filtered, and the filtrate is taken to dryness under vacuum. If the product is not a powder or crystalline solid, it is re-dissolved in hexane and the solvent is removed under vacuum. The latter procedure has the effect of removing any excess isopropyl alcohol as a hexane/isopropyl alcohol azeotrope.

EXAMPLE 3

Dipropylene Glycol Solutions of Catalysts

A general procedure for preparing dipropylene glycol (DPG) solutions of catalysts is given here. If the catalyst is a neat solid or liquid, it can simply be dissolved in DPG. However, if the catalyst is available as a solution that contains excess alcohol, a DPG solution of the catalyst can be prepared by first adding the desired amount of DPG to the alcohol solution containing the catalyst. Then the excess alcohol can be removed under vacuum, by distillation, or by vacuum distillation to leave the DPG solution of the catalyst behind. It may be necessary to use anhydrous DPG to prevent premature deactivation of some of the catalysts.

EXAMPLE 4

Zirconium(IV) Acetylacetonate Octahydrate (Zr(acac)$_4$·8H$_2$O)

Zirconium(IV) acetylacetonate (1.0 g) was stirred with deionized water (20 ml) for approximately 60 hours. The white solid was then washed with diethyl ether (3×20 ml) and suction filtered dry. The presence of water of hydration was determined by FTIR. Anal. Calcd for Zr(acac)$_4$·8H$_2$O: 14.44% Zr. Found: 14.4% Zr.

EXAMPLE 5

Technique for Measuring Catalyst Activity and Selectively

A series of Group IVB metal compounds are compared with prior art catalysts using a general and quantitative technique for measuring catalyst activity and selectivity. In this technique the rate of isocyanate consumption as a function of time was measured using a formulation similar to that of Example 6, but containing monofunctional reactants. Reaction samples drawn at the indicated times were quenched with dibutylamine and analyzed by liquid chromatography. The catalysts were compared on an equimolar basis corresponding to a loading of 0.35 pphp DABCO® 33LV catalyst (33 wt % triethylenediamine (TEDA) in DPG) in an actual foam, illustrated by Example 6. The results are summarized in Table 1.

TABLE 1

| Catalyst | | Time (min) | | | | | | | | |
|---|---|---|---|---|---|---|---|---|---|---|
| | | 0.5 | 1.0 | 1.5 | 2.0 | 2.5 | 3.0 | 4.0 | 6.0 | 8.0 |
| KNOWN AMINE BLOWING CATALYSTS | | | | | | | | | | |
| Thermal | Selectivity | 0.61 | 0.73 | 0.79 | 0.81 | 0.82 | 0.82 | 0.79 | 0.74 | 0.72 |
| Background | % NCO Conversion | 4.6 | 9.1 | 14.0 | 18.2 | 24.5 | 28.5 | 35.8 | 46.6 | 53.1 |
| BL-19 | Selectivity | 1.30 | 1.31 | 1.22 | 1.16 | 1.11 | 1.07 | 1.01 | 0.96 | 0.90 |
| | % NCO Conversion | 17.7 | 29.9 | 40.8 | 49.3 | 56.0 | 61.8 | 69.9 | 78.0 | 81.9 |
| PC-5 | Selectivity | 1.08 | 1.08 | 1.04 | 1.00 | 0.95 | 0.95 | 0.89 | 0.86 | 0.88 |
| | % NCO Conversion | 17.3 | 33.6 | 47.3 | 56.8 | 63.8 | 68.6 | 76.2 | 83.0 | 86.0 |
| BL-22 | Selectivity | 0.98 | 0.99 | 0.96 | 0.94 | 0.91 | 0.89 | 0.82 | 0.75 | 0.75 |
| | % NCO Conversion | 15.4 | 32.0 | 43.6 | 53.2 | 61.1 | 67.5 | 75.2 | 81.3 | 85.0 |
| ZF-10 | Selectivity | 1.05 | 1.06 | 1.04 | 1.01 | 0.98 | 0.94 | 0.88 | 0.79 | 0.76 |
| (U.S. Pat. No. 4,338,408) | % NCO Conversion | 9.6 | 20.3 | 26.4 | 33.8 | 39.7 | 45.3 | 54.5 | 65.5 | 72.1 |
| TITANIUM BLOWING CATALYSTS | | | | | | | | | | |
| Thermal | Selectivity | 0.61 | 0.73 | 0.79 | 0.81 | 0.82 | 0.82 | 0.79 | 0.74 | 0.72 |
| Background | % NCO Conversion | 4.6 | 9.1 | 14.0 | 18.2 | 24.5 | 28.5 | 35.8 | 46.6 | 53.1 |
| KR TTS[a] | Selectivity | 0.90 | 0.96 | 1.02 | 1.06 | 1.12 | 1.15 | 1.08 | 1.07 | 0.99 |
| | % NCO Conversion | (~6) | 14.8 | 23.5 | 34.1 | 44.3 | 53.4 | 65.4 | 76.9 | 81.2 |
| $Ti(OiPr)_4$[b] | Selectivity | 0.92 | 0.97 | 1.03 | 1.05 | 1.09 | 1.11 | 1.11 | 1.08 | 1.07 |
| | % NCO Conversion | 10.7 | 23.4 | 36.4 | 47.0 | 57.2 | 64.5 | 74.1 | 82.3 | 85.9 |
| $Ti(OBu)_4$ | Selectivity | 0.85 | 0.93 | 0.98 | 1.04 | 1.09 | 1.13 | 1.20 | 1.16 | 1.12 |
| (0.35 pphp) | % NCO Conversion | 9.5 | 19.8 | 32.0 | 43.3 | 53.2 | 61.2 | 73.5 | 83.9 | 86.6 |
| $TiO(acac)_2$[b] | Selectivity | 1.24 | 1.11 | 1.17 | 1.21 | 1.22 | 1.20 | 1.12 | 1.02 | 0.91 |
| | % NCO Conversion | 7.6 | 17.4 | 29.6 | 40.3 | 50.7 | 58.6 | 69.8 | 79.5 | 83.8 |
| $Ti(OiPr)_3(acac)$[g] | Selectivity | 1.12 | 1.19 | 1.24 | 1.23 | 1.21 | 1.18 | 1.03 | 0.86 | 0.82 |
| | % NCO Conversion | 10.8 | 22.5 | 35.2 | 46.2 | 54.4 | 59.8 | 68.9 | 75.1 | 81.4 |
| $Ti(OiPr)_2(acac)_2$[g] | Selectivity | 1.03 | 1.09 | 1.11 | 1.13 | 1.13 | 1.11 | 1.07 | 1.02 | 0.98 |
| (pure solid) | % NCO Conversion | 11.0 | 21.9 | 32.7 | 42.5 | 51.2 | 57.5 | 67.4 | 76.6 | 80.9 |
| $Ti(OiPr)_2(acac)_2$ | Selectivity | 0.90 | 0.98 | 1.07 | 1.10 | 1.15 | 1.16 | 1.22 | 1.18 | 1.10 |
| (neat liquid after 2-propanol stripped from Aldrich product) | % NCO Conversion | 5.2 | 11.5 | 18.2 | 26.0 | 34.1 | 41.6 | 55.2 | 72.4 | 80.3 |
| $Ti(OiPr)_2(acac)_2$ | Selectivity | 0.69 | — | 0.88 | 1.08 | 1.16 | 1.20 | 1.23 | 1.25 | 1.20 |
| (liquid added at t = 0) | % NCO Conversion | 7.4 | — | 25.6 | 30.6 | 40.0 | 48.1 | 61.1 | 76.8 | 83.8 |
| $Ti(OiPr)_2(acac)_2$ | Selectivity | 0.69 | 0.87 | 0.96 | 1.04 | 1.13 | 1.17 | 1.21 | 1.16 | 1.09 |
| DPG soln/t = 0 | % NCO Conversion | 6.9 | 13.8 | 20.4 | 28.4 | 37.3 | 45.3 | 57.5 | 73.2 | 80.3 |
| Thermal | Selectivity | 0.61 | 0.73 | 0.79 | 0.81 | 0.82 | 0.82 | 0.79 | 0.74 | 0.72 |
| Background | % NCO Conversion | 4.6 | 9.1 | 14.0 | 18.2 | 24.5 | 28.5 | 35.8 | 46.6 | 53.1 |
| $Ti(OiPr)_2(EtAA)_2$ | Selectivity | — | 0.90 | 0.97 | 0.98 | 1.03 | 1.05 | 1.04 | 0.94 | 0.86 |
| TYZOR DC | % NCO Conversion | — | 12.3 | 20.0 | 29.1 | 38.3 | 46.6 | 58.0 | 69.9 | 75.3 |
| $Ti(OiPr)(TEA)$ | Selectivity | — | 0.99 | 1.02 | 1.05 | 1.06 | 1.06 | 1.01 | 0.84 | 0.79 |
| TYZOR TE | % NCO Conversion | — | 13.9 | 23.5 | 33.4 | 44.3 | 51.9 | 64.7 | 75.4 | 82.0 |
| $Ti(OBu)(TEA)$ | Selectivity | 1.02 | 1.04 | 1.06 | 1.09 | 1.16 | 1.20 | 1.22 | 1.19 | 1.12 |
| | % NCO Conversion | 8.8 | 20.3 | 32.8 | 45.4 | 55.8 | 64.0 | 76.6 | 86.3 | 89.5 |
| $Ti(OiPr)_2salen$ | Selectivity | 1.87 | 2.71 | 1.57 | 0.79 | 0.70 | 0.71 | 0.72 | 0.73 | 0.73 |
| | % NCO Conversion | 16.5 | 47.1 | 74.3 | 84.0 | 88.1 | 89.1 | 89.7 | 89.8 | 91.2 |
| $Ti(OiPr)_2(salald)_2$ | Selectivity | 0.89 | 0.97 | 0.98 | — | — | 1.00 | — | 0.94 | 0.91 |
| ~20 min in MB | % NCO Conversion | 4.6 | 9.7 | 15.2 | — | — | 33.0 | — | 62.7 | 72.5 |
| $Ti(OiPr)_2(salald)_2$ | Selectivity | 1.00 | 1.04 | 1.09 | 1.14 | 1.17 | 1.22 | 1.23 | 1.18 | 1.14 |
| added at t = 0 | % NCO Conversion | 7.3 | 14.0 | 21.5 | 29.7 | 39.2 | 48.3 | 61.8 | 79.1 | 86.7 |
| $Ti(OiPr)_2(salam)_2$ | Selectivity | 0.90 | 1.00 | 1.08 | 1.12 | 1.16 | 1.18 | 1.17 | 1.12 | 1.06 |
| added at t = 0 | % NCO Conversion | 7.5 | 16.0 | 25.9 | 33.6 | 43.9 | 51.5 | 63.7 | 76.1 | 83.0 |
| $Ti(OiPr)_2(HAP)_2$ | Selectivity | 1.11 | 0.99 | 1.05 | 1.09 | 1.09 | 1.05 | 0.97 | 0.84 | 0.81 |
| | % NCO Conversion | 8.4 | 16.5 | 27.0 | 39.3 | 49.3 | 57.6 | 64.2 | 71.0 | 74.4 |
| ZIRCONIUM BLOWING CATALYSTS | | | | | | | | | | |
| NZ-01 | Selectivity | 1.26 | 1.36 | 1.51 | 1.61 | 1.63 | 1.63 | 1.56 | 1.30 | 1.18 |
| | % NCO Conversion | 6.3 | 14.7 | 24.2 | 35.6 | 47.8 | 57.5 | 69.5 | 78.7 | 83.8 |
| NZ-33 | Selectivity | 0.90 | 1.05 | 1.09 | 1.17 | 1.22 | 1.23 | 1.21 | 1.10 | 1.00 |
| | % NCO Conversion | 5.05 | 11.4 | 18.6 | 27.5 | 36.5 | 45.2 | 57.4 | 69.2 | 73.8 |
| $Zr(acac)_4$[b] | Selectivity | 1.17 | 1.34 | 1.51 | 1.66 | 1.77 | 1.83 | 1.77 | 1.01 | 0.88 |
| (17 h in MB) | % NCO Conversion | 6.1 | 12.9 | 21.3 | 31.4 | 42.8 | 52.9 | 68.2 | 79.9 | 85.3 |
| $Zr(acac)_4$ | Selectivity | 1.22 | 1.41 | 1.59 | 1.74 | 1.86 | 1.88 | 1.78 | 0.96 | 0.86 |
| (17 h in MB) | % NCO Conversion | 6.1 | 13.7 | 22.6 | 33.1 | 44.4 | 54.3 | 68.3 | 79.2 | 82.2 |
| $Zr(acac)_4 \cdot 8H_2O$[i] | Selectivity | 1.18 | 1.41 | 1.57 | 1.71 | 1.81 | 1.90 | 1.90 | 1.36 | 1.06 |
| | % NCO Conversion | 6.2 | 14.0 | 22.7 | 32.3 | 42.4 | 52.4 | 67.7 | 83.5 | 88.5 |
| $Zr(OiPr)_3(acac)$[g] | Selectivity | 1.06 | 1.28 | 1.40 | 1.57 | 1.71 | 1.79 | 1.78 | 1.22 | 0.94 |
| | % NCO Conversion | 5.7 | 12.4 | 19.9 | 29.5 | 40.2 | 50.1 | 65.0 | 76.4 | 81.8 |
| $Zr(OiPr)_3(acac)$[g,h] | Selectivity | 0.86 | 1.10 | 1.25 | 1.39 | 1.56 | 1.60 | 1.47 | 0.95 | 0.84 |
| 39% in DPG soln | % NCO Conversion | 6.0 | 12.5 | 20.5 | 30.5 | 42.4 | 54.3 | 68.4 | 79.3 | 85.9 |
| $Zr(OiPr)_4 \cdot iPrOH$[b] | Selectivity | 1.13 | 0.98 | 1.02 | 1.04 | 1.05 | 1.07 | 1.06 | 0.96 | 0.87 |
| | % NCO Conversion | 4.1 | 9.9 | 15.6 | 21.4 | 27.0 | 33.0 | 44.1 | 60.2 | 69.0 |
| $Zr(OnPr)_3(acac)$[g] | Selectivity | 0.92 | 1.39 | 1.54 | 1.67 | 1.90 | 1.80 | 1.77 | 1.06 | 0.94 |

TABLE 1-continued

| Catalyst | | Time (min) | | | | | | | | |
|---|---|---|---|---|---|---|---|---|---|---|
| | | 0.5 | 1.0 | 1.5 | 2.0 | 2.5 | 3.0 | 4.0 | 6.0 | 8.0 |
| | % NCO Conversion | 8.9 | 13.8 | 23.5 | 35.4 | 49.4 | 59.5 | 72.7 | 80.0 | 85.3 |
| Thermal | Selectivity | 0.61 | 0.73 | 0.79 | 0.81 | 0.82 | 0.82 | 0.79 | 0.74 | 0.72 |
| Background | % NCO Conversion | 4.6 | 9.1 | 14.0 | 18.2 | 24.5 | 28.5 | 35.8 | 46.6 | 53.1 |
| $Zr(OnPr)_4$[b] | Selectivity | 0.75 | 1.08 | 1.16 | 1.25 | 1.32 | 1.37 | 1.37 | 1.25 | 1.16 |
| 70% in n-PrOH | % NCO Conversion | 6.6 | 11.3 | 17.9 | 25.3 | 33.6 | 41.6 | 57.1 | 72.8 | 78.3 |
| $Zr(OBu)_2(acac)_2$[d] | Selectivity | 1.15 | 1.42 | 1.69 | 1.91 | 2.03 | 2.02 | 1.54 | 0.88 | 0.86 |
| 60% in nBuOH | % NCO Conversion | 6.8 | 15.3 | 25.9 | 39.8 | 53.6 | 64.3 | 74.8 | 84.2 | 88.4 |
| $Zr(OBu)_2(acac)_2$[d,h] | Selectivity | 1.18 | 1.34 | 1.46 | 1.59 | 1.76 | 1.75 | 1.68 | 1.20 | 1.04 |
| 41% in DPG | % NCO Conversion | 6.7 | 14.4 | 23.5 | 34.7 | 46.2 | 56.1 | 69.7 | 81.1 | 88.2 |
| $Zr(OBu)_2(acac)_2$[d] | Selectivity | 1.50 | 1.52 | 1.67 | 1.82 | 1.92 | 1.98 | 1.92 | 1.43 | 1.17 |
| 22.5 h in MB | % NCO Conversion | 6.5 | 14.7 | 24.0 | 34.5 | 45.8 | 55.3 | 67.6 | 76.8 | 82.8 |
| $Zr(OBu)_4 \cdot nBuOH$[e] | Selectivity | 0.86 | 0.98 | 1.10 | 1.19 | 1.25 | 1.30 | 1.32 | 1.27 | 1.24 |
| | % NCO Conversion | 5.0 | 10.7 | 16.7 | 23.4 | 31.8 | 39.5 | 51.8 | 68.5 | 75.0 |
| $Zr(OtBu)_3(acac)$[g] | Selectivity | 0.85 | 1.30 | 1.47 | 1.65 | 1.80 | 1.85 | 1.75 | 1.09 | 0.94 |
| | % NCO Conversion | (10.9) | 13.2 | 22.2 | 33.7 | 46.3 | 57.4 | 71.5 | 79.9 | 85.4 |
| $Zr(OtBu)_4$[b] | Selectivity | 0.84 | 0.92 | 0.95 | 0.99 | 1.00 | 1.02 | 1.03 | 1.02 | 0.99 |
| | % NCO Conversion | 8.9 | 14.7 | 20.4 | 26.1 | 32.3 | 38.6 | 49.9 | 67.0 | 74.9 |
| $Zr(OPe)_3(acac)$[g] | Selectivity | 1.38 | 1.63 | 1.80 | 1.98 | 2.02 | 1.96 | 1.55 | 0.93 | 0.91 |
| 55% in n-pentanol | % NCO Conversion | 7.5 | 17.3 | 29.6 | 44.6 | 58.4 | 68.2 | 77.4 | 85.5 | 90.2 |
| $Zr(OPe)_4$ 50%[e] | Selectivity | 1.12 | 1.22 | 1.35 | 1.44 | 1.56 | 1.61 | 1.64 | 1.53 | 1.41 |
| in n-pentanol | % NCO Conversion | 5.7 | 12.5 | 20.0 | 29.2 | 39.7 | 48.2 | 63.1 | 75.8 | 79.9 |
| $Zr(OiPr)_3(EtAA)$[g] | Selectivity | 1.00 | 1.11 | 1.18 | 1.27 | 1.40 | 1.45 | 1.46 | 1.35 | 1.20 |
| | % NCO Conversion | 5.1 | 12.5 | 19.9 | 27.8 | 37.3 | 46.9 | 62.6 | 75.9 | 80.1 |
| $Zr(OiPr)_3(DMEA)$[f] | Selectivity | 0.77 | 0.87 | 0.94 | 0.99 | 1.06 | 1.10 | 1.13 | 1.08 | 0.98 |
| | % NCO Conversion | 7.1 | 14.5 | 21.9 | 30.0 | 38.5 | 47.0 | 60.6 | 74.4 | 79.1 |
| $Zr(OiPr)_3(O_2C_{18})$[g] | Selectivity | 0.74 | — | 1.04 | 1.14 | 1.19 | 1.38 | 1.31 | 1.31 | 1.22 |
| | % NCO Conversion | 7.7 | — | 15.3 | 23.2 | 31.6 | 43.8 | 57.2 | 75.1 | 80.0 |
| $Zr(OiPr)_2(DEG)$[f] | Selectivity | 0.88 | 0.94 | 0.99 | 1.02 | 1.03 | 1.03 | 1.02 | 0.89 | 0.79 |
| 7-29-96 | % NCO Conversion | 4.8 | 9.4 | 14.6 | 20.3 | 29.8 | 36.6 | 42.4 | 59.5 | 66.9 |
| $Zr(OiPr)(TEA)$[g] | Selectivity | 1.49 | 1.61 | 1.57 | 1.59 | 1.64 | 1.60 | 1.28 | 0.75 | 0.72 |
| solid | % NCO Conversion | 8.3 | 16.7 | 26.1 | 37.9 | 51.7 | 63.3 | 75.6 | 85.7 | 87.6 |
| $Zr(OiPr)(TEA)$ | Selectivity | 1.30 | 1.27 | 1.35 | 1.35 | 1.56 | 1.49 | 1.62 | 1.50 | 1.28 |
| in DPG | % NCO Conversion | 7.0 | 13.6 | 21.2 | 30.6 | 41.7 | 53.0 | 71.8 | 86.0 | 88.7 |
| | COUNTER EXAMPLES | | | | | | | | | |
| $Ti(OBu)_4$ | Selectivity | 0.85 | 0.88 | 0.89 | 0.90 | 0.89 | 0.90 | 0.90 | 0.88 | 0.87 |
| (0.02 pphp) | % NCO Conversion | 5.5 | 10.6 | 15.7 | 21.2 | 27.7 | 31.9 | 43.3 | 57.1 | 66.6 |
| $Ti(OBu)4$ | Selectivity | 0.79 | 0.85 | 0.86 | 0.86 | 0.86 | 0.87 | 0.87 | 0.84 | 0.81 |
| (0.04 pphp) | % NCO Conversion | 5.5 | 10.2 | 15.2 | 20.2 | 25.7 | 30.6 | 40.2 | 56.1 | 66.4 |
| Thermal | Selectivity | 0.61 | 0.73 | 0.79 | 0.81 | 0.82 | 0.82 | 0.79 | 0.74 | 0.72 |
| Background | % NCO Conversion | 4.6 | 9.1 | 14.0 | 18.2 | 24.5 | 28.5 | 35.8 | 46.6 | 53.1 |
| $Ti(OiPr)_3BSPDA$ | Selectivity | 0.56 | 0.68 | 0.74 | 0.81 | 0.87 | 0.92 | 1.00 | 0.96 | 0.96 |
| | % NCO Conversion | 5.8 | 12.2 | 18.5 | 25.8 | 34.5 | 43.1 | 59.8 | 80.6 | 87.4 |
| $Cp_2TiCl_2$ | Selectivity | 0.75 | 0.83 | 0.85 | 0.84 | 0.86 | 0.88 | 0.88 | 0.91 | 0.94 |
| | % NCO Conversion | 4.9 | 10.6 | 16.0 | 21.2 | 27.4 | 36.5 | 44.7 | 63.2 | 73.8 |
| $Ti(OiPr)_3(TAEA)$ | Selectivity | 0.75 | 0.80 | — | 0.81 | 0.85 | 0.82 | 0.88 | 0.86 | 0.82 |
| added at t = 0 | % NCO Conversion | 5.1 | 10.5 | — | 21.6 | 27.2 | 33.0 | 45.5 | 62.0 | 71.9 |
| $Ti(OiPr)(sal)_2$ | Selectivity | 0.79 | 0.87 | 0.88 | 0.89 | 0.88 | 0.88 | 0.91 | 0.89 | 0.84 |
| | % NCO Conversion | 4.6 | 10.1 | 15.2 | 20.4 | 28.6 | 32.2 | 42.3 | 57.1 | 66.3 |
| KR 212[a] | Selectivity | 0.84 | 0.91 | 0.92 | 0.94 | 0.92 | 0.93 | 0.88 | 0.81 | 0.74 |
| | % NCO Conversion | 4.9 | 10.3 | 15.8 | 21.8 | 27.9 | 33.7 | 44.0 | 58.8 | 65.4 |
| $ZrO(NO_3)_2 \cdot 6H_2O$ | Selectivity | 0.81 | 0.84 | 0.87 | 0.88 | 0.88 | 0.87 | 0.87 | 0.84 | 0.80 |
| | % NCO Conversion | — | 8.6 | 12.9 | 17.2 | 21.3 | 25.5 | 33.4 | 47.8 | 57.6 |
| $Zr(hfac)_4$ | Selectivity | 0.92 | 0.81 | 0.85 | 0.86 | 0.86 | 0.86 | 0.87 | 0.88 | 0.88 |
| added to MB | % NCO Conversion | 2.9 | 7.0 | 10.3 | 14.0 | 17.7 | 21.1 | 27.7 | 39.8 | 49.4 |
| $Zr(hfac)_4$[c] | Selectivity | 0.47 | 0.51 | 0.58 | 0.65 | 0.72 | 0.80 | 0.89 | 0.90 | 0.92 |
| added at t = 0 | % NCO Conversion | 9.9 | 16.6 | 22.4 | 29.0 | 36.1 | 44.3 | 55.8 | 68.2 | 75.2 |
| $Zr(TMHD)_4$[c] | Selectivity | 0.23 | 0.34 | 0.44 | 0.52 | 0.60 | 0.68 | 0.80 | 0.89 | 0.86 |
| | % NCO Conversion | 9.5 | 18.3 | 26.5 | 34.4 | 42.2 | 49.5 | 62.5 | 77.0 | 80.6 |
| $Zr(TMHD)_4$[c] | Selectivity | 0.23 | 0.36 | 0.47 | 0.60 | 0.75 | 0.87 | 1.03 | 1.00 | 0.94 |
| 16.5 h in MB | % NCO Conversion | 10.0 | 22.7 | 28.4 | 39.1 | 52.2 | 63.2 | 79.4 | 87.8 | 88.8 |
| $Zr(OiPr)(TMHD)_3$ | Selectivity | 0.38 | 0.59 | 0.74 | 0.87 | 1.04 | 1.12 | 1.12 | 1.00 | 0.89 |
| | % NCO Conversion | 8.2 | 16.6 | 25.4 | 36.1 | 47.3 | 56.6 | 69.5 | 76.8 | 79.8 |
| $Zr(tfac)_4$ | Selectivity | 0.66 | 0.82 | 0.88 | 0.91 | 0.91 | 0.91 | 0.90 | 0.89 | 0.86 |
| added to MB | % NCO Conversion | 4.0 | 8.3 | 13.0 | 16.9 | 21.4 | 25.4 | 33.6 | 48.2 | 58.4 |
| $Zr(tfac)_4$ | Selectivity | 0.26 | 0.38 | 0.49 | 0.58 | 0.68 | 0.76 | 0.86 | 0.90 | 0.88 |
| added at t = 0 | % NCO Conversion | 11.2 | 22.5 | 33.0 | 43.7 | 52.4 | 59.8 | 71.3 | 83.1 | 87.0 |

[a]Supplied by Kenrich Petrochemical Co.;
[b]Supplied by Aldrich Chemical Co.;
[c]Supplied by Strem Chemicals;
[d]Supplied by Gelest, Inc.;
[e]Supplied by Alfa Aesar;
[f]Made by procedure of Ex. 1;
[g]Made by procedure of Ex. 2;

TABLE 1-continued

|  | Time (min) | | | | | | | | |
|---|---|---|---|---|---|---|---|---|---|
| Catalyst | 0.5 | 1.0 | 1.5 | 2.0 | 2.5 | 3.0 | 4.0 | 6.0 | 8.0 |

[h]Made by procedure of Ex. 3;
[i]Made by procedure of Ex. 4.
MB = Masterbatch;
BL-19 = bis(dimethylaminoethyl)ether;
PC-5 = pentamethyldiethylenetriamine;
BL-22 = 70 wt. % pentamethyldiethylenetriamine, 30 wt. % pentamethyldipropylenetriamine;
ZF-10 = 2-[N-dimethylaminoethoxyethyl)-N-methylamino]ethanol;
KR212 = di(dioctyl)phosphato, ethylene titanate;
KR TTS = isopropyl triisostearoyl titanate;
TYZOR DC = titanium(IV) bis(ethylacetoacetato)diisopropoxide;
TYZOR TE = titanium(IV) (triethanolaminato)isopropoxide, 80 wt. % in 2-propanol;
NZ-01 = neopentyl(diallyl)oxy, trineodecanoyl zirconate;
NZ-33 = neopentyl(diallyl)oxy, trimethacryl zirconate;
TMHD = 2,2,6,6-tetramethyl-3,5-heptanedionato;
OiPr = isopropoxy,
acac = acetylacetonato;
EtAA = ethylacetoacetato;
HAP = 2'-acetylphenoxy;
TEA = triethanolaminato;
salen = N,N'-bis(salicylidene)ethylenediimino,
tfac = 1,1,1-trifluoroacetylacetato;
hfac = 1,1,1,5,5,5-hexafluoroacetylacetato;
OnPr = n-propoxy;
OBu = n-butoxy;
OtBu = t-butoxy;
OPe = n-pentoxy;
iPrOH = isopropyl alcohol;
nPrOH = n-propyl alcohol;
nBuOH = n-butyl alcohol;
DMEA = N,N'-dimethylaminoethanol;
$O_2C_{18}$ = stearate;
DEG = di(ethylene glycolate);
DPG = di(propylene glycol);
sal = salicylate;
salald = salicyladehyde;
salam = salicylamido;
EG = ethylene glycolate;
BSPDA = N,N'-bis(salicylidene)-1,3-propanediamine;
Cl = chloride;
$NO_3$ = nitrate;
Cp = cyclopentadienyl;
TAEA = tris(aminoethyl)amine.

These data show that depending on the ligands selected for the Group IVB metal catalyst, selectivity to blowing or gelling is affected. In general, the most active blowing catalysts have higher isocyanate (% NCO) conversions than the thermal background control and high blow-to-gel selectivity at early reaction times (more than about 1 within the first 2.5 minutes of the reaction). In comparing compounds to identify blowing and gelling catalysts, performance throughout the first 2.5 minutes of the reaction needs to be considered. For example, a strong gelling catalyst may have a blow-to-gel selectivity of 0.3 at 0.5 minutes of the reaction and most of the polyol will have reacted by 2 minutes of reaction time. The blow-to-gel selectivity will then increase after 2 minutes and may approach or exceed 1 because the isocyanate-water reaction is the only reaction which is not yet complete. An example of a strong gelling catalyst as described herein is $Zr(OiPr)(TMHD)_3$.

In contrast, a strong blowing catalyst may have a blow-to-gel selectivity of 1.8 at 0.5 minutes of reaction and most of the water will have reacted by 2 minutes of reaction time. After 2 minutes, the blow-to-gel selectivity will decrease and may approach 0.7 or less because the isocyanate-polyol reaction is the only reaction which is not yet complete. An example of a strong blowing catalyst as described herein is $Ti(OiPr)_2$salen.

Several examples of titanium and zirconium blowing catalysts of this invention reach a blow-to-gel selectivity of at least about 1 sometime during the first 2.5 minutes of the reaction, and also show activity above that of the thermal background during the same time period are presented in this example. Many act as delayed-activity catalysts. That is, they show a dramatic improvement in their activity (% NCO conversion) between reaction times of approximately 1.0 and 6.0 minutes. The delayed activity can be very useful in enabling a mold to be completely filled before gelling occurs.

There are a number of counter examples which show that some titanium and zirconium compounds display little or no selectivity to blowing. For example, $Zr(TMHD)_4$ and $Zr(tfac)_4$ show the activity and selectivity of a gelling catalyst. Several catalysts, for example, titanium (isopropoxide)(salicylate)$_2$, and zirconyl nitrate hexahydrate, have little or no effect on selectivity or activity when compared to thermal background.

It should be noted that depending on the ligands present, the amount of compound needed to catalyze the blowing reaction will vary. If too little catalyst is used, the performance may be essentially that of the thermal background. In the above examples, when titanium tetrabutylate was used at 0.02 pphp or 0.04 pphp (4 to 8 times the 0.005 pphp use level of titanium tetrabutylate that was used in Example 3 of U. S. Pat. No. 3,450,648), its performance was similar to the thermal background. However, when it was used at a 0.35 pphp level, it performed as a good blowing catalyst.

The effects of ligands on catalyst selectivity to blowing or gelling as determined using the TDI foam model reaction are summarized in Table 2.

salicylate, cyclopentadienyl, chloride, tris(aminoethyl) amine, or N,N'-bis(salicylidene)1,3-propanediamine, the compounds show essentially no activity as catalysts for either the gelling or the blowing reaction. If one or more of the ligands are either 1,1,1-trifluoro-2,4-pentanedionate or 2,2,6,6,-tetramethyl-3,5-heptanedionate, the compounds perform as gelling catalysts.

TABLE 2

$(ML_1L_2L_3L_4.S)$

| M | $L_1$ | $L_2$ | $L_3$ | $L_4$ | Coordinated Solvent, S | Catalytic Performance |
|---|---|---|---|---|---|---|
| Ti | OiPr | OiPr | OiPr | OiPr | — | blowing catalyst |
| Ti | O | acac | acac | — | — | blowing catalyst |
| Ti | OiPr | OiPr | OiPr | acac | — | blowing catalyst |
| Ti | OiPr | OiPr | acac | acac | — | blowing catalyst |
| Ti | OiPr | OiPr | EtAA | EtAA | — | blowing catalyst |
| Ti | OiPr | TEA | — | — | — | blowing catalyst |
| Ti | OBu | TEA | — | — | — | blowing catalyst |
| Ti | OiPr | OiPr | salen | — | — | blowing catalyst |
| Ti | OiPr | OiPr | salald | salald | — | blowing catalyst |
| Ti | OiPr | Oipr | salam | salam | — | blowing catalyst |
| Ti (KR TTS) | OiPr | isostearoyl | isostearoyl | isostearoyl | — | blowing catalyst |
| Zr (NZ-01) | neopentyl (diallyl)oxy | neodecanoyl | neodecanoyl | neodecanoyl | — | blowing catalyst |
| Zr (NZ-33) | neopentyl (diallyl)oxy | methacryl | methacryl | methacryl | — | blowing catalyst |
| Zr | acac | acac | acac | acac | — | blowing catalyst |
| Zr | acac | acac | acac | acac | 8 × $H_2O$ | blowing catalyst |
| Zr | OiPr | OiPr | OiPr | OiPr | iPrOH | blowing catalyst |
| Zr | OiPr | OiPr | OiPr | acac | — | blowing catalyst |
| Zr | OnPr | OnPr | OnPr | OnPr | — | blowing catalyst |
| Zr | OnPr | OnPr | OnPr | acac | — | blowing catalyst |
| Zr | OBu | OBu | OBu | OBu | nBuOH | blowing catalyst |
| Zr | OBu | OBu | acac | acac | — | blowing catalyst |
| Zr | OtBu | OtBu | OtBu | OtBu | — | blowing catalyst |
| Zr | OtBu | OtBu | OtBu | acac | — | blowing catalyst |
| Zr | OPe | OPe | OPe | OPe | — | blowing catalyst |
| Zr | OPe | OPe | OPe | acac | — | blowing catalyst |
| Zr | OiPr | OiPr | OiPr | EtAA | — | blowing catalyst |
| Zr | OiPr | OiPr | Oipr | DMEA | — | blowing catalyst |
| Zr | OiPr | OiPr | OiPr | stearate | — | blowing catalyst |
| Zr | OiPr | OiPr | DEG | — | — | blowing catalyst |
| Ti | OiPr | OiPr | OiPr | BSPDA | — | very low activity |
| Ti | Cp | Cp | Cl | Cl | — | very low activity |
| Ti | OiPr | OiPr | OiPr | TAEA | — | very low activity |
| Ti | OiPr | sal | sal | — | — | very low activity |
| Ti (KR212) | dioctyl-phosphato | dioctyl-phosphato | EG | — | — | very low activity |
| Zr | O | $NO_3$ | $NO_3$ | — | 6 × $H_2O$ | no activity |
| Zr | hfac | hfac | hfac | hfac | — | intermediate selectivity catalyst |
| Zr | TMHD | TMHD | TMHD | TMHD | — | gelling catalyst |
| Zr | OiPr | TMHD | TMHD | TMHD | — | gelling catalyst |
| Zr | tfac | tfac | tfac | tfac | — | gelling catalyst |

Contrary to the teachings of the prior art, it was found that titanium and zirconium compounds can selectively catalyze the water-isocyanate (blowing) reaction. It was also compound that blow-to-gel selectivity is dependent upon the ligands that are coordinated to the metals. The data obtained in this example show that, if the ligands are selected from among alkoxides and chelates such as acetylacetonate, ethyl acetoacetate, carboxylates, salicylaldehyde, salicylamide, triethanolamine, N,N'-bis(salicylidene) ethylenediamine, N,N'-dimethylaminoethanol, and di(ethylene glycolate), the compounds perform as good blowing catalysts. However, if the ligands are chosen from nitrate, dioctylphosphate,

EXAMPLE 6

In this example a polyurethane foam was prepared in a conventional manner using the following polyurethane formulation:

| Component | parts by weight |
|---|---|
| E-648 | 60 |
| E-519 | 40 |
| DC-5043 | 1.5 |
| Diethanolamine | 1.49 |

-continued

| Component | parts by weight |
|---|---|
| Water | 3.5 |
| TDI 80 | 105 Index |

E-648 - an ethylene oxide tipped polyether polyol marketed by Arco
E-519 - a styrene-acrylonitrile copolymer filled polyether polyol marketed by Arco
DC-5043 - DABCO ® DC-5043 silicone surfactant marketed by Air Products and Chemicals, Inc.
TDI 80 - a mixture of 80 wt. % 2, 4-TDI and 20 wt. % 2, 6-TDI For each foam, the catalyst was added to 202 g of the above premix in a 32 oz (951 ml) paper cup and the formulation was mixed for 20 seconds at ~5000 RPM using an overhead stirrer fitted with a 2 in. (5.1 cm) diameter stirring paddle. Sufficient TDI 80 was added to make a 105 index foam [index =(mole isocyanate/mole active hydrogen)×100] and the formulation was mixed well for 5 seconds using the same overhead stirrer. The 32 oz. cup was dropped through a hole in the bottom of a 128 oz. (3804 ml) paper cup placed on a stand. The hole was sized to catch the lip of the 32 oz. cup. The total volume of the foam container was 160 oz. (4755 ml). Foams approximated this volume at the end of the foam forming process. The maximum foam height, final foam height, time to reach the top of the mixing cup (TOC1), time to reach the top of the 128 oz. cup (TOC2), and string gel time were recorded (see Table 3).

DABCO 33-LV and DABCO BL-1 I were used as the control catalyst combination in Sample A. DABCO 33-LV gelling catalyst is 33 wt % TEDA in DPG. DABCO BL-11 blowing catalyst is 70 wt % bis(dimethylaminoethyl)ether in DPG. DABCO 33-LV and Ti(OiPr)$_2$(acac)$_2$ were used in the catalyst combination of Samples C and D. Catalyst levels in Samples C and D were chosen to match the string gel time of the control foam (Sample A). Some delay was seen in the front end of the reaction for Samples C and D, as shown by the longer times to reach the tops of cups 1 and 2 (TOC1 and TOC2). Because the formulation can more completely fill the mold before curing begins, this type of "front-end delay" could be advantageous. When no blowing catalyst was present (Sample B), all of the times are considerably longer compared to Samples A, C, and D. The appreciably longer string gel time of Sample B is undesirable because it corresponds to a longer time required to cure the foam before it can be removed from the mold.

TABLE 3

| Sample | Catalysts | TOC1 (sec) | TOC2 (sec) | Gel Time (sec) | Full Height (mm) | Foam Height (mm) |
|---|---|---|---|---|---|---|
| A | 0.50 pphp DABCO 33-LV/ 0.15 pphp DABCO BL-11 | 9.91 | 27.63 | 62.21 | 424.77 | 396.09 |
| B | 0.50 pphp DABCO 33-LV | 15.38 | 45.64 | 85.07 | 417.03 | 375.41 |
| C | 0.50 pphp DABCO 33-LV/ 0.24 pphp Ti(OiPr)$_2$(acac)$_2$ | 15.02 | 35.83 | 60.41 | 421.12 | 368.33 |
| D | 0.58 pphp DABCO 33-LV/ 0.20 pphp Ti(OiPr)$_2$(acac)$_2$ | 13.85 | 32.57 | 63.84 | 421.67 | 371.05 |

What is claimed is:

1. In a method for preparing a polyurethane foam which comprises reacting an organic polyisocyanate and a polyol in the presence of water as a blowing agent and a catalyst composition comprising a gelling catalyst and a blowing catalyst, the improvement which comprises using a catalytically effective amount of a blowing catalyst composition represented by the following formulae:

$[M(L^1)(L^2)(L^3)(L^4)]_n$ $[M(L^1)(L^2)(L^3)]_n$ $[M(L^1)(L^2)]_n$ $[M(L^1)]_n$ wherein M is titanium, zirconium, or hafnium; n ranges from 1 to 20; and $L^1$, $L^2$, $L^3$, and $L^4$ are the same or different ligands selected from the following groups of ligands: (1) oxygen, sulfur, or nitrogen; (2) an alcoholate, phenolate, glycolate, thiolate, carboxylate, dithiocarbamate, aminoalcoholate, phosphonate, pyrophosphate, sulfonate, or silylamide, any of which contains from 1 to 20 carbon atoms and, optionally, contains one or more functional groups, or oxygen-, sulfur-, nitrogen-, or phosphorus-containing linkages; (3) a non-fluorine containing and non-sterically hindered β-diketone, N,N-dimethylethanolamine, triethanolamine, salicylaldehyde, salicylamide, phenylsalicylate, cyclopentanone-2-carboxylate, acetalacetoneimine, bis-acetylacetylacetone, thioacetylacetone, or a N,N'-bis(salicylidene) ethylenediamine.

2. The method of claim 1 wherein n ranges from 1 to 10.

3. The method of claim 1 wherein M is titanium or zirconium and at least one of $L^1$, $L^2$, $L^3$, and $L^4$ is selected from group (3).

4. The method of claim 1 wherein M is titanium or zirconium and at least one of $L^1$, $L^2$, $L^3$, and $L^4$ is selected from the group consisting of an alcoholate and at least one other of $L^1$, $L^2$, $L^3$, and $L^4$ is a non-fluorine containing, non-sterically hindered β-diketone.

5. The method of claim 1 wherein M is titanium or zirconium and at least one of $L^1$, $L^2$, $L^3$, and $L^4$ is selected from the group consisting of an alcoholate, a glycolate, a carboxylate, salicylaldehyde, salicylamide, triethanolamine, N,N'-bis(salicylidene) ethylenediamine, N,N'-dimethylaminoethanol, di(ethyleneglycolate), ethyl acetylacetonate and acetylacetonate.

6. The method of claim 1 wherein M is titanium or zirconium and up to 4 of $L^1$, $L^2$, $L^3$, and $L^4$ are the same or different ligands selected from the group consisting of isopropylate, n-propylate, n-butylate, tert-butylate, n-pentylate, and acetylacetonate.

7. The method of claim 1 wherein M is titanium or zirconium and up to 3 of $L^1$, $L^2$, $L^3$, and $L^4$ are the same or different alcoholates selected from the group consisting of isopropylate, n-propylate, n-butylate, tert-butylate, and n-pentylate and another of $L^1$, $L^2$, $L^3$, and $L^4$ is acetylacetonate, ethyl acetylacetonate, triethanolamine, N,N'-bis(salicylidene)ethylenediamine, salicylaldehyde, salicylamide, and ethylene glycolate.

8. The method of claim 1 wherein the amount of blowing catalyst is 0.01 to 10 parts per 100 parts of polyol.

9. The method of claim 1 wherein the amount of blowing catalyst is 0.05 to 2 parts per 100 parts of polyol.

10. In a method for preparing a polyurethane foam which comprises reacting an organic polyisocyanate and a polyol in the presence of water as a blowing agent and a catalyst composition comprising a gelling catalyst and a blowing catalyst, the improvement which comprises using a catalytically effective amount of a blowing catalyst selected from the group consisting of titanium(IV) isopropoxide, titanium (IV) n-butoxide, titanium(IV) 2-ethylhexoxide, zirconium (IV) n-butoxide, zirconium(IV) n-pentoxide, titanium(IV) bis(ethyl acetoacetato)diisopropoxide, titanium(IV) diisopropoxide bis(2,4-pentanedionate), titanium(IV) tris isopropoxide (2,4-pentanedionate), titanium(IV) (triethanolaminato)isopropoxide, titanium(IV) (triethanolaminato)n-butoxide, titanium(IV) (N,N'-bis(salicylidene)ethylenediimino) diisopropoxide, titanium(IV) oxide acetylacetonate, isopropyl tri isostearoyl titanate, zirconium(IV) tris isopropoxide (2,4-pentanedionate), zirconium(IV) tris-n-propoxide (2,4-pentanedionate), zirconium(IV) di-n-butoxide bis(2,4-pentanedionate), zirconium(IV) tris-n-pentoxide (2,4-pentanedionate), zirconium(IV) tris-t-butoxide (2,4-pentanedionate), zirconium(IV) (triethanolaminato)isopropoxide, zirconium (IV) acetylacetonate, zirconium(IV) acetylacetonate hydrate, neopentyl(diallyl)oxy trineodecanoyl zirconate, and neopentyl(diallyl)oxy trimethacryl zirconate.

11. In a method for preparing a polyurethane foam which comprises reacting an organic polyisocyanate and a polyol in the presence of water as a blowing agent and a catalyst composition comprising a gelling catalyst and a blowing catalyst, the improvement which comprises using a catalytically effective amount of a blowing catalyst selected from the group consisting of titanium(IV) diisopropoxide bis(2,4-pentanedionate), titanium(IV) tris isopropoxide (2,4-pentanedionate), titanium(IV) (triethanolaminato)n-butoxide, titanium(IV) (N,N'-bis(salicylidene)ethylenediimino) diisopropoxide, zirconium (IV) n-pentoxide, zirconium(IV) tris isopropoxide (2,4-pentanedionate), zirconium(IV) tris-n-propoxide (2,4-pentanedionate), zirconium(IV) di-n-butoxide bis(2,4-pentanedionate), zirconium(IV) tris-n-pentoxide (2,4-pentanedionate), zirconium(IV) tris-t-butoxide (2,4-pentanedionate), zirconium(IV) (triethanolaminato) isopropoxide, zirconium(IV) acetylacetonate, zirconium (IV) acetylacetonate hydrate, and neopentyl(diallyl)oxy trineodecanoyl zirconate.

12. The method of claim 10 wherein the gelling catalyst is a tertiary amine.

13. The method of claim 10 wherein the gelling catalyst is triethylenediamine.

* * * * *